United States Patent
Lerche

(10) Patent No.: US 6,457,175 B1
(45) Date of Patent: Sep. 24, 2002

(54) METHOD AND APPARATUS FOR INSTALLING A SOFTWARE UPGRADE WITHIN A MEMORY RESOURCE ASSOCIATED WITH A COMPUTER SYSTEM

(75) Inventor: Robert A. Lerche, Belmont, CA (US)

(73) Assignee: Tut Systems, Inc., Pleasant Hill, CA (US)

(*) Notice: Subject to any disclaimer, the term of this patent is extended or adjusted under 35 U.S.C. 154(b) by 0 days.

(21) Appl. No.: 09/189,023

(22) Filed: Nov. 9, 1998

(51) Int. Cl.$^7$ .............................................. G06F 9/445
(52) U.S. Cl. ....................... 717/173; 717/170; 717/178; 709/221; 710/64; 710/74
(58) Field of Search ..................... 713/2, 100; 709/221, 709/222; 710/74, 72, 55, 64, 68, 10; 380/251; 463/42, 43; 717/168, 170, 173, 174, 178

(56) References Cited

U.S. PATENT DOCUMENTS

| | | | |
|---|---|---|---|
| 5,699,275 A | * 12/1997 | Beasley et al. ............. | 709/221 |
| 5,701,492 A | * 12/1997 | Wadsworth et al. .......... | 717/11 |
| 5,759,102 A | * 6/1998 | Pease et al. ................... | 463/42 |
| 5,809,251 A | * 9/1998 | May et al. ................... | 709/223 |
| 5,848,064 A | * 12/1998 | Cowan ....................... | 370/338 |
| 5,852,735 A | * 12/1998 | Urban ........................ | 717/11 |
| 5,870,609 A | * 2/1999 | Thornton et al. ............. | 717/11 |
| 5,896,566 A | * 4/1999 | Averbuch et al. ........... | 455/419 |
| 5,905,523 A | * 5/1999 | Woodfield et al. ............ | 348/12 |
| 5,999,741 A | * 12/1999 | May et al. ..................... | 717/11 |
| 6,047,128 A | * 4/2000 | Zander ........................ | 717/11 |
| 6,151,657 A | * 11/2000 | Sun et al. .................... | 711/103 |
| 6,301,480 B1 | * 10/2001 | Kennedy, III et al. ...... | 455/445 |
| 6,311,291 B1 | * 10/2001 | Barrett, Sr. .................. | 714/25 |

OTHER PUBLICATIONS

"Concurrent Operations on the Database", *Principles of Database Systems*, Computer Science Press, 1982, pp 394–399.

* cited by examiner

Primary Examiner—Tuan Q. Dam
(74) Attorney, Agent, or Firm—Blakely, Sokoloff, Taylor & Zafman LLP

(57) ABSTRACT

A method of installing a software application image, for a software upgrade, within a remote and embedded target device includes the step of storing both a current and an upgraded software application image within an EEPROM within the target device. The set of instructions embodied within the current application image is maintained within the target device, while a validation operation is performed with respect to a set of instructions embodied within the upgraded software application image. Only once complete installation and successful execution of the upgraded application image have been validated is the upgraded application image designated as a current application image, and the previously installed application image discarded. Accordingly, the risk of the target device being a rendered unbootable as a result of the installation of a software upgrade is reduced.

32 Claims, 9 Drawing Sheets

METHOD AND APPARATUS FOR INSTALLING A SOFTWARE UPGRADE WITHIN A MEMORY RESOURCE ASSOCIATED WITH A COMPUTER SYSTEM

FIELD OF THE INVENTION

The present invention relates generally to the field of software installation and, more specifically, to the field of replacing a first set of instructions stored within a memory resource associated with a machine, with a second set of instructions for execution by the machine.

BACKGROUND OF THE INVENTION

Microprocessors and microcontrollers are being used increasingly in embedded applications to provide operational and functional intelligence within a wide variety of devices. It will be appreciated that the software stored within memories associated with such microprocessors and microcontrollers may require upgrading from time to time to provide increased or modified functionality to a device in which the microprocessor or microcontroller is embedded. With the proliferation of networks in a wide variety of applications, such as the home environment, software installed on a networked device may often conveniently be upgraded from a remote location via the network. However, it may occur that a networked device is positioned in a location which is difficult to access, or even inaccessible. The remote upgrading of software stored within a memory associated with the networked device may be problematic in that, should the upgrade installation fail for some reason, the networked device may be rendered totally inoperative. The restoration of functionality to the network device may in such cases be expensive and inconvenient. This is especially true when the networked device is being upgraded from a remote location, and service personnel are required to be dispatched to the site of the networked device to address and correct the failed software upgrade operation.

SUMMARY OF THE INVENTION

According to the invention, there is provided a method of installing a second set of instructions within a machine, the machine including a memory resource storing a first and the second set of instructions. The machine executes the first set of instructions, and validates the second set of instructions. If the second set of instructions is validated, the second set of instructions is then indicated as being executable in place of the first set of instructions.

Other features of the present invention will be apparent from the accompanying drawings and from the detailed description that follows.

BRIEF DESCRIPTION OF THE DRAWINGS

The present invention is illustrated by way of example, and not limitation, in the figures of the accompanying drawings in which like references indicate similar elements.

DETAILED DESCRIPTION

A method and apparatus for installing a software upgrade within a memory resource associated with a computer system are described. In the following description, for the purposes of explanation, numerous specific details are set forth in order to provide a thorough understanding of the present invention. It will be evident, however, to one skilled in the art that the present invention may be practiced without these specific details.

Figure 1:
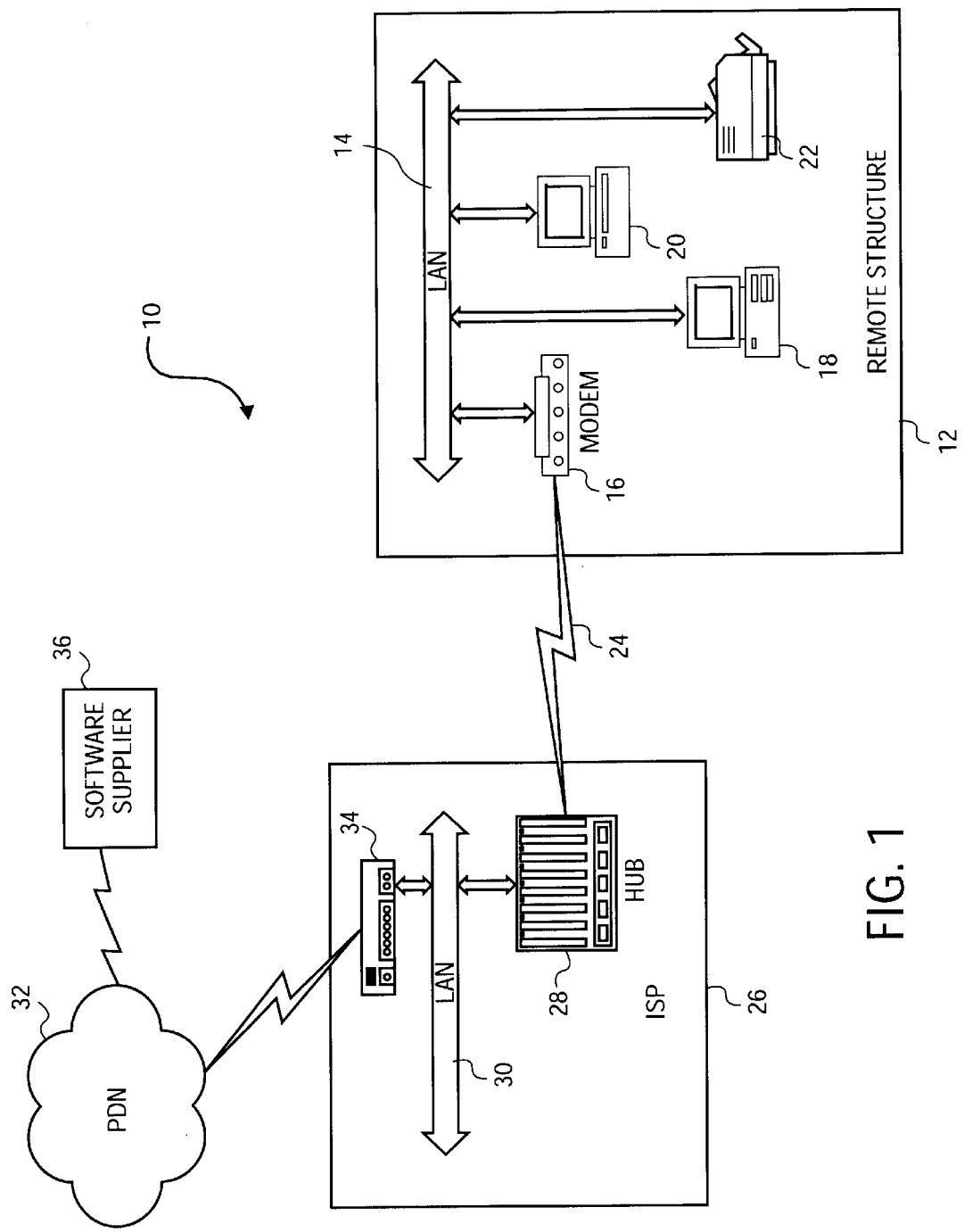
FIG. 1 is a diagrammatic representation of a networked environment within which the present invention may be employed.

FIG. 1 is a diagrammatic representation of an exemplary network environment 10 within which the present invention may be employed. Specifically, a remote structure 12, for example a small office or home, is shown to accommodate a local area network (LAN) 14 that networks a modem 16, a personal computer 18, a Macintosh 20, and a printer 22. The LAN 14 may be implemented utilizing Unshielded Twisted Pair (UTP) wiring, power supply wiring, dedicated network wiring, or infrared connections, within the remote structure 12. In one embodiment, the LAN 14 is implemented over UTP wiring within the remote location 12 using the HomeRun™ networking technology developed by Tut Systems, Inc. of Pleasant Hill, Calif. The modem 16 is shown to establish a communication link 24 to an Internet Service Provider (ISP) 26 and, more specifically, to a hub 28 operated by the ISP 26. The communications link 24 may be implemented over conventional plain old telephone service (POTS) wiring, and may comprise a Digital Subscriber Line (DSL) link. Alternatively, the communications link may be established via radio frequency communications, or satellite. The hub 28 may include a number of cards (not shown) such as, for example, a management card, a line card, and a switch card. Each of these cards may carry a processor, such as the 68360 microprocessor manufactured by Motorola Inc.. The ISP 26 also implements a LAN 30, via which the hub 28 is networked or coupled to the public data network (PDN) via a router 34.

Figure 2:
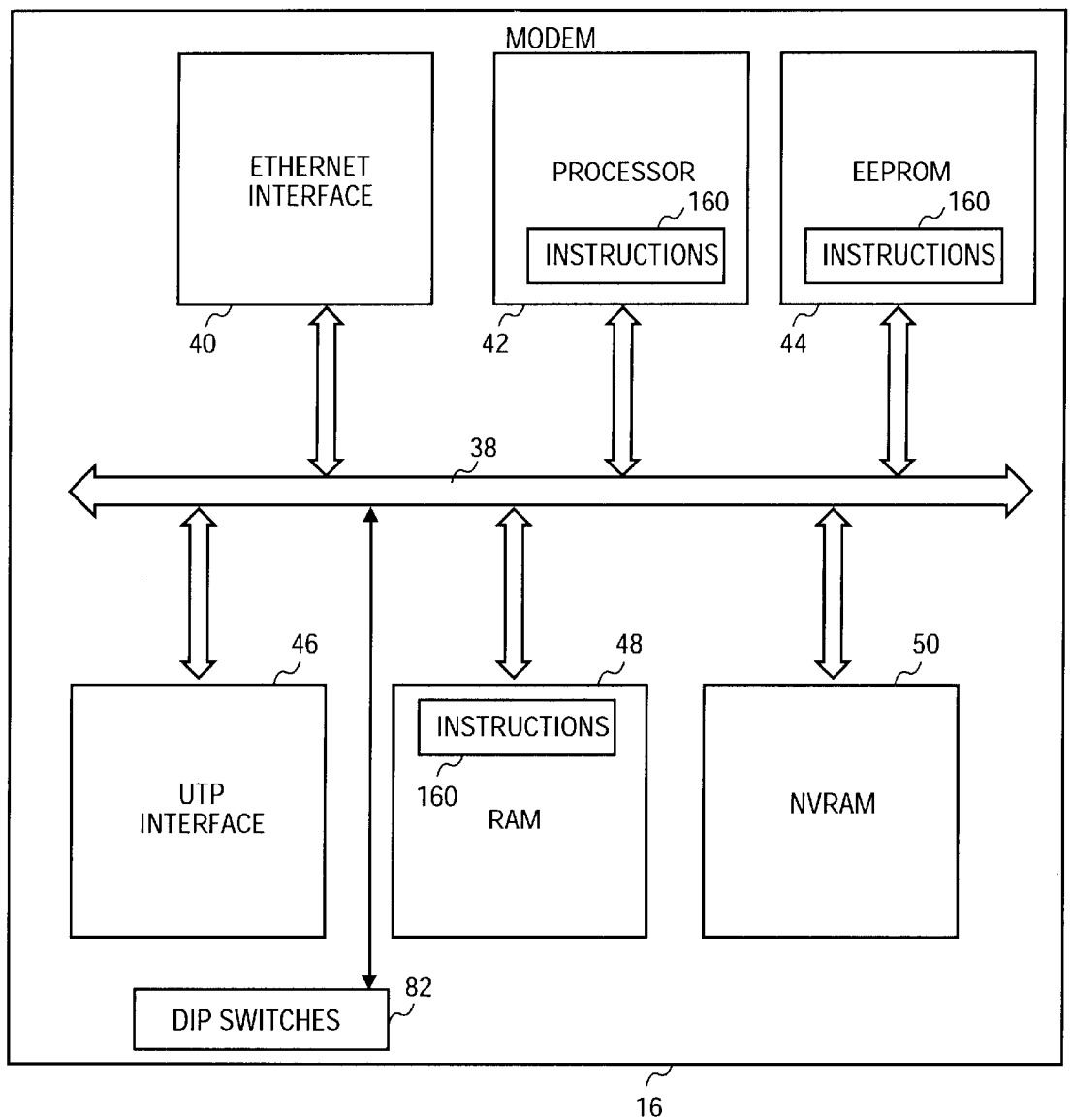
FIG. 2 is a block diagram illustrating an exemplary machine in the form of a modem within which the present invention may be employed.

FIG. 2 is a block diagram illustrating an exemplary embodiment of the composition of the modem 16. Specifically, the modem 16 is shown to include a bus 38 via which the various components of the modem 16 communicate and are interfaced. The modem 16 also includes an Ethernet interface 40 via which the modem 16 communicates over the LAN 14. In one embodiment, the Ethernet interface 40 facilitates 10baseT communications over the LAN 14. A processor 42, for example a 68302 processor manufactured by Motorola Inc., an electrically erasable programmable read-only memory (EEPROM) (or flash memory) 44, a UTP interface 46, a random access memory (RAM) 48 and a non-volatile random access memory (NVRAM) 50 are also all shown to be coupled to the bus 38. The EEPROM 44 and the RAM 48 store sequences of instructions that are executed by the processor 42 and that control operation of the modem 16.

It will be appreciated that, from time to time, the manufacturer of the modem 16 may wish to release upgraded software for installation and execution within the modem 16. Typically, such an upgrade operation requires that the upgraded software be loaded into and stored within at least the EEPROM 44. One option would be to distribute the software to the user of the modem 16 (e.g., on a diskette or CD-ROM), and have the user manually install the upgraded software. As will be appreciated from FIG. 1, a software supplier 36 coupled to the PDN 32 may remotely distribute and install the upgraded software on the modem 16, as this may provide a number of operational efficiencies. While the downloading and installation of software within the modem 16 via the communications link 24 may be performed without end-user intervention, there is a risk that the installation of the upgraded software may be unsuccessful. In a worst-case scenario, the attempted upgrade may in fact place the modem 16 in a condition in which it cannot boot at all. Specifically, wherein the downloaded software is not executable, for example as a result of a corrupt transmission, and the corrupt software overwrites previously installed software, the modem 16 may not be revivable from a remote location. In such as situation, manual intervention by the software supplier 36 or ISP 26 may be required to return the modem 16 to an operational state. Where the software supplier has a large installed base of modems, such manual intervention may be prohibitively expensive.

With a view to avoiding situations within which manual intervention may be required to restore functionality, and specifically the ability to boot, to a target machine such as a computer system, the present invention proposes a software download mechanism that prevents a target of the download operation from being placed in the state in which it cannot boot at all. In summary, the present invention teaches maintaining at least two software images within a memory resource associated with a processor of a computer system. Specifically, a first of the software images is an image of software that has been validated and is known to be executable on the target machine. A second software image is only validated for execution after it is known to run successfully, and to perform at least one predetermined task (e.g., to establish communication with a network device following a reset). The first ("old") image is retained within the memory resource in case the second ("new") image fails to execute. The present invention is advantageous in that a software image that is known to be executable is always maintained within the memory resource, so that the target device is never placed in a situation in which it cannot boot. Specifically, in the case that the second "new" software image is unexecutable, for whatever reason, the target machine may always be booted from the first "old" software image.

For the purposes of the present specification, the term "software image" shall be taken to mean the output of a linker (also termed a link editor or binder) that combines object modules to form an executable program. The term "set of instructions" shall be taken to include the term "software image".

While the below description describes an exemplary embodiment of the invention in the context of the networked environment 10 shown in FIG. 1, and specifically as implemented within the modem 16, it will be appreciated that the teachings of the present invention are applicable to a wide range of environments and applications. The teachings of the present invention are applicable to any situation or environment in which an upgraded or second version of a software program, or portion of such a program, is installed within or on a machine. For example, the upgrading of software installed on remote Internet access devices, such as x2 modems, or web access devices such as WebTV, may utilize the teachings of the present invention. Further, the teachings of the present invention may be applied to facilitate reliable upgrading of software within machines executing Java code.

Figure 3:
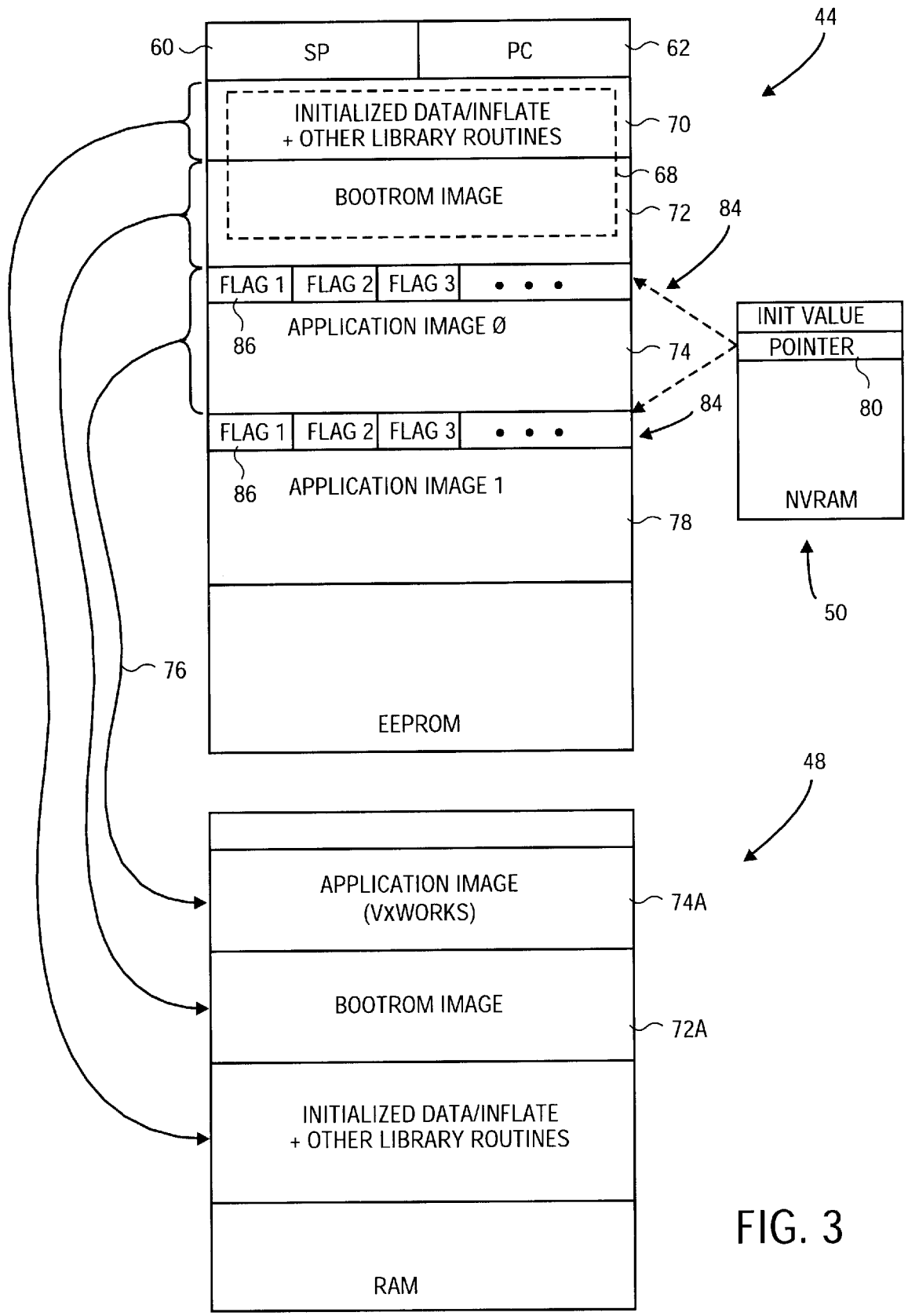
FIG. 3 is a block diagram illustrating an exemplary system memory layout, according to one embodiment of the present invention, that may be implemented within the memory of the machine illustrated in FIG. 2.

Referring now to FIG. 3, there is illustrated an exemplary memory layout that may be implemented within the EEPROM 44 and RAM 48 of the modem 16. Referring first to the EEPROM 44, a stack pointer (SP) 60 and a program counter (PC) 62 are stored at the lowest address within the EEPROM 44. The stack pointer 60 and the program counter 62 are retrieved by hardware upon reset or power up of the modem 16, and identify the location at which the execution of programs stored within the EEPROM 44 is to begin. Adjacent the memory location at which the stack pointer and the program counter 60 and 62 are stored, boot code 68 is stored within the EEPROM 44. The boot code 68 comprises initialized data and inflate and other library routines 70, as well as a boot EPROM image 72. The boot code 68 initializes the general registers of the processor 42, and initializes other hardware modules that allow the modem 16 to setup memory and to communicate with external devices. Immediately below the boot code 68, a first application image 74 is stored within the EEPROM 44. In one embodiment, the application image 74 comprises a combination of (1) an embedded, real-time operating system, such as the VxWorks operating system developed by Wind River Systems of Alameda, Calif. and (2) application software for operation of the modem 16. While the application image 74 may in certain embodiments be executable from within the EEPROM 44, access to the RAM 48 is faster, and it may thus be desirable to move the application image 74 from the EEPROM 44 to the RAM 48, as indicated by arrow 76. The application image 74 may furthermore be compressed, in which case the application image 74 is decompressed before being stored within the RAM 48. The boot code 68, and specifically the inflate routine, is responsible for performing the above transfer and decompression operations.

A second application image 78 is stored within the EEPROM 44 immediately below the first application image 74. The second application image may comprise an updated or modified version of the operating system and application software embodied in the first application image 74. Alternatively, the first application image 74 may comprise an upgraded version of the operating system and application software embodied in the second application image 78. In any event, either one of the application images 74 or 78 may be designated as a "current" application image, which is decompressed and transferred to the RAM 48 for execution. In one embodiment, the current application image is identified by a pointer value 80 stored within the NVRAM 50. The non-current application image may be a new application image that has been downloaded and stored in the EEPROM 44, but not as yet validated, or an old application image for which the current application image is a replacement. For example, the pointer 80 may point to a current and executable "old" application image, while upgraded "new" software, in the form of a second application image, may be written to a second application image location within the EEPROM 44. Upon successful validation of the "new" application image, the pointer 80 may then be switched to indicate the "new" application image as the current application image for execution in place of the "old" application image. Any further software upgrade downloads may then be written over the "old" application image, as the executability of the new software image will have been verified, and the danger of rendering the machine unbootable is reduced.

As illustrated in FIG. 3, each of the application images 74 and 78 includes a header portion 84 including a number of the flags 86. In one embodiment, each of the flags 86 may represent and indicate the completion of a validation step with respect to the associated application image for example, a sequence of flags may indicate that the application image 74 or 78 has the been completely written to the EEPROM 44, that the application image has been utilized for an application boot operation at least once, that is the modem 16 has performed at least one predetermined operation under the direction of the application image, or that the application image is factory installed.

With respect to the predetermined operation mentioned above, the modem 16 may, merely for example, under the direction of an as yet unvalidated software image, attempt to perform a sequence of steps required for the establishment of a valid connection from the modem 16 to the ISP 26. These steps may involve booting the modem 16, turning on a DSL line, performing a set of the synchronization steps with respect to the ISP 26, sending a predetermined message to the ISP 26, and receiving a response from the ISP 26. Upon receipt of the message from the ISP 26, a flag indicating successful completion of the predetermined operation may be toggled.

In one embodiment of the present invention, the application images may conveniently be written into the EEPROM 44 so that sector boundaries divide the application images 74 and 78. This allows an application image and associated flags to be erased in a single step by writing all bits within a relevant sector to one (1). In this case, the flags may be set by setting a flag from 1 to 0 (that is, the flags are set low).

A more detailed description of an exemplary embodiment of the present invention, and specifically of a system memory layout and boot-up procedure of a target device, such as a the modem 16, will now be described with reference to FIGS. 4 and 5. The exemplary embodiment will be described in the context of the VxWorks operating system developed by Wind River Systems, Inc. However, the broad teachings of the present invention could also be implemented utilizing real-time operating systems (RTOS) such as the QNX operating system developed by QNX Software System Limited, or the Windows C.E. operating system developed by Microsoft Corp. of Redmond, Wash.

The VxWorks operating system supports a wide variety of target memory configurations. One exemplary memory configuration is described below. It will readily be appreciated that the principles described below may equally well be implemented in an alternative memory configuration. Referring now specifically to FIG. 4, the EEPROM 44 is shown to include an initial stack pointer (SP) 60 and an initial program counter (PC) 62. The EEPROM 44 stores a VxWorks development boot EEPROM image 72 below the stack pointer 60 and the program counter 62, the boot ROM image 72 functioning to load a test version of a target application via the Ethernet interface 40. The boot ROM image 72 is a special VxWorks application that reads in a link module and branches to it, restarting the target (i.e., the modem 16). Besides loading a test version of an application, the boot ROM image 72 can also be executed to set or display memory, set boot parameters, set an Ethernet MAC address in the NVRAM 50, or launch to an arbitrary memory address. Depending on boot parameters, it either loads an application image for execution after a delay, or runs a simple command loop. In the modem 16, even though the development boot ROM image 72 is present, it will not necessarily be executed during normal operation as a romStart routine, to be described below, selects an application image instead.

Below the development boot ROM image 72, a compressed application ROM image 74 is stored, the application ROM image 74 containing an application image 74A to be copied directly to the RAM 48, as indicated by the arrow 76 at power-on reset time. As RAM 48 access is typically faster than EEPROM 44 access, application images typically are not executed directly out of the EEPROM 44. However, the VxWorks operating system supports a ROM resident configuration, which may be utilized in the present invention where speed is less important than the conservation of RAM capacity. The application image 74A is stored at a RAM_LOW_ADDRESS location within the RAM 48, and both ethernet-loaded and ROM-loaded applications begin execution at this address. It will be noted that the boot ROM image 72A, transferred from the compressed boot ROM image 72, is stored at RAM_HIGH_ADDRESS, thus providing room within the RAM 48 for the application image 74A to be accommodated between the RAM_LOW_ADDRESS and the RAM_HIGH_ADDRESS. In one exemplary embodiment, the modem 16 may include a second ROM that holds a second application ROM image 78, a pointer 80 in the NVRAM 50 indicating either the image 74 or 78 as being a current image for execution by the processor 42. In an alternative embodiment of the present invention, as illustrated in FIG. 3, a single ROM may accommodate both images 74 and 78. In either case, it should be noted that two application images 74 and 78 are stored and are transferable to the RAM 48 for execution purposes.

The boot-up, or starting, of the modem 16 will now be described. The program counter 62 indicates an initial entry point following a modem 16 power-on reset. Specifically, the entry point is indicated as being the romInit routine stored in romInit.s. The romInit routine does basic hardware initialization, set up the processor stack, and branches to a romStart routine in the bootInit.c. The romStart routine is the first C code to execute, and functions to clear memory, copy a current application image from the EEPROM 44 to the RAM 48, and to jump to a RAM 48 entry point. In one embodiment, a standard VxWorks configuration positions a romStart routine image at either the RAM_LOW_ADDRESS or the RAM_HIGH_ADDRESS, opposite the application image 74A. Although linked to such a RAM address, the romStart routine begins execution within the EEPROM 44. Specifically, the romStart routine first calls a copyLong routine, and copies the romStart routine image text and data to the RAM address. After copying the start-up code and clearing the rest of the RAM 48 to zero's, the romStart routine then decompresses the application image 74A, and branches to it. The romStart routine is furthermore responsible for selecting which of the application images 74 or 78 to execute based on the pointer 80 stored within the NVRAM 50, the state of the images indicated by the image headers 84, and possibly an external input such as a setting of the dip switches 82.

Figure 4:
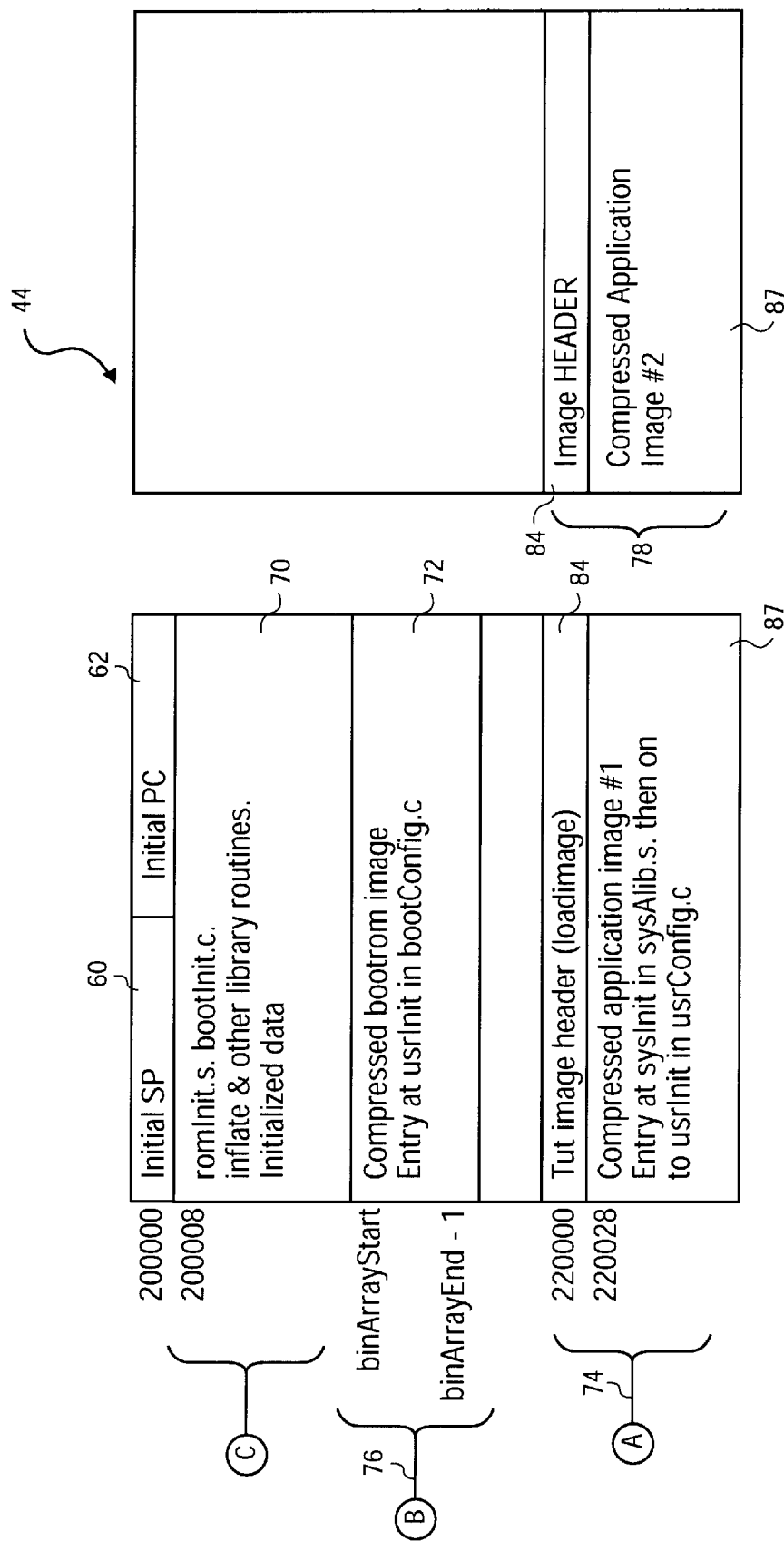
FIGS. 4 and 5 are block diagrams providing further details regarding a memory layout for an exemplary embodiment of the present invention.
Figure 5:
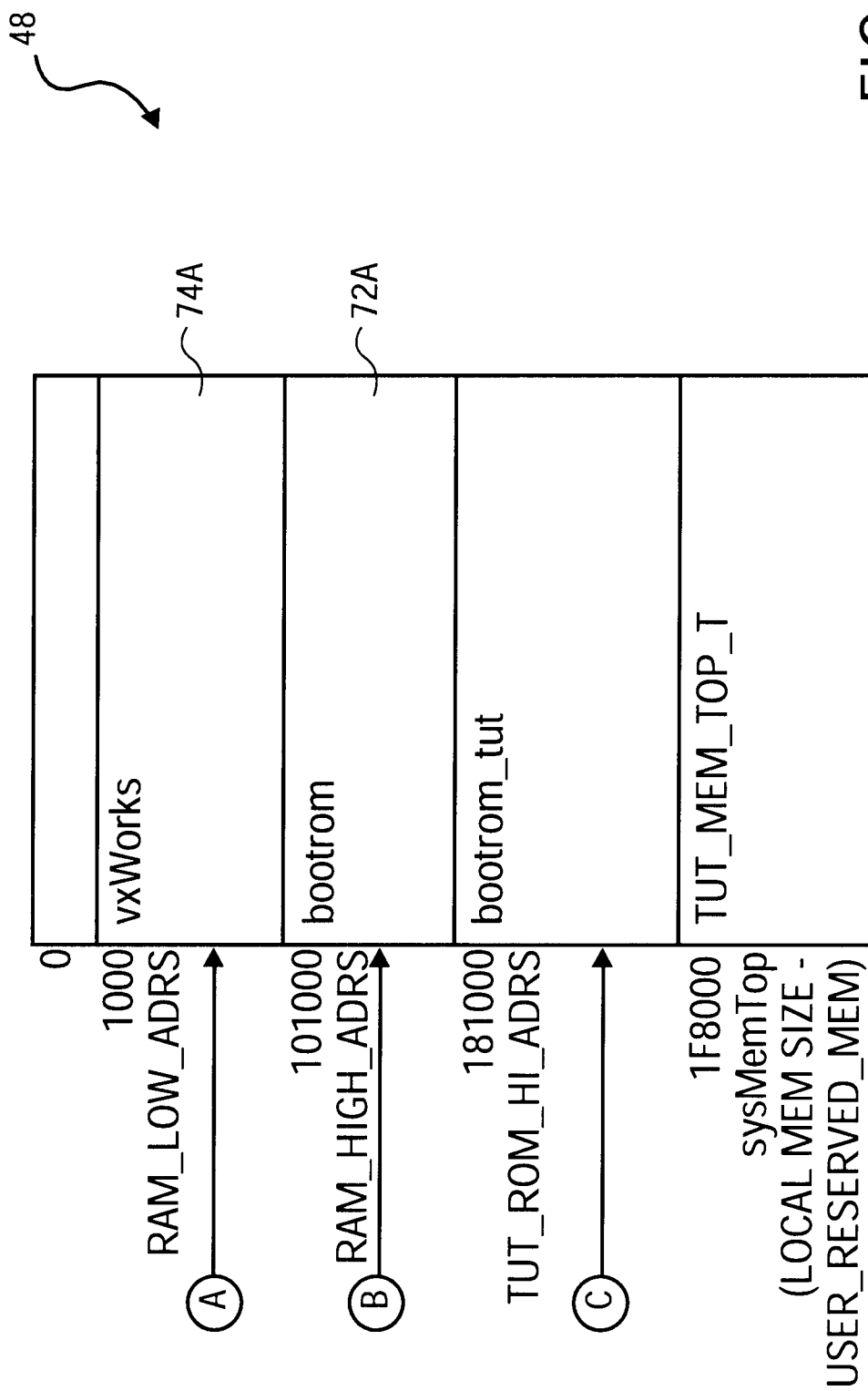

As illustrated in FIG. 4, each of the application images 74 and 78 includes both an image header portion 84 and a compressed body portion 87. Each of the application image header portion 84 includes a number of flags 86 providing information concerning the associated application image. Specifically, the flags 86 may indicate whether the application image is complete (that is, whether the application image was successfully written into the EEPROM 44); whether execution of the application image has been attempted once; and whether the modem 16 runs successfully under the application image (e.g., communicates with a line card within the hub 28 of the ISP 26). The image header portion 84 may also include flags 86 indicating the size of the image, the type of the image, and a string giving the software revision name. In one embodiment, an initial application image that is factory installed may include an additional flag marking the image as factory installed, and indicating that the image is expected to work, and should be tried first. Accordingly, the romStart routine may examine the image header portions 84 associated with both images 74 and 78 to determine which of these application images is current. For example, the flag 86 indicating that the application image runs successfully will not be set for a newly loaded application image which has not been validated.

Figure 6A:
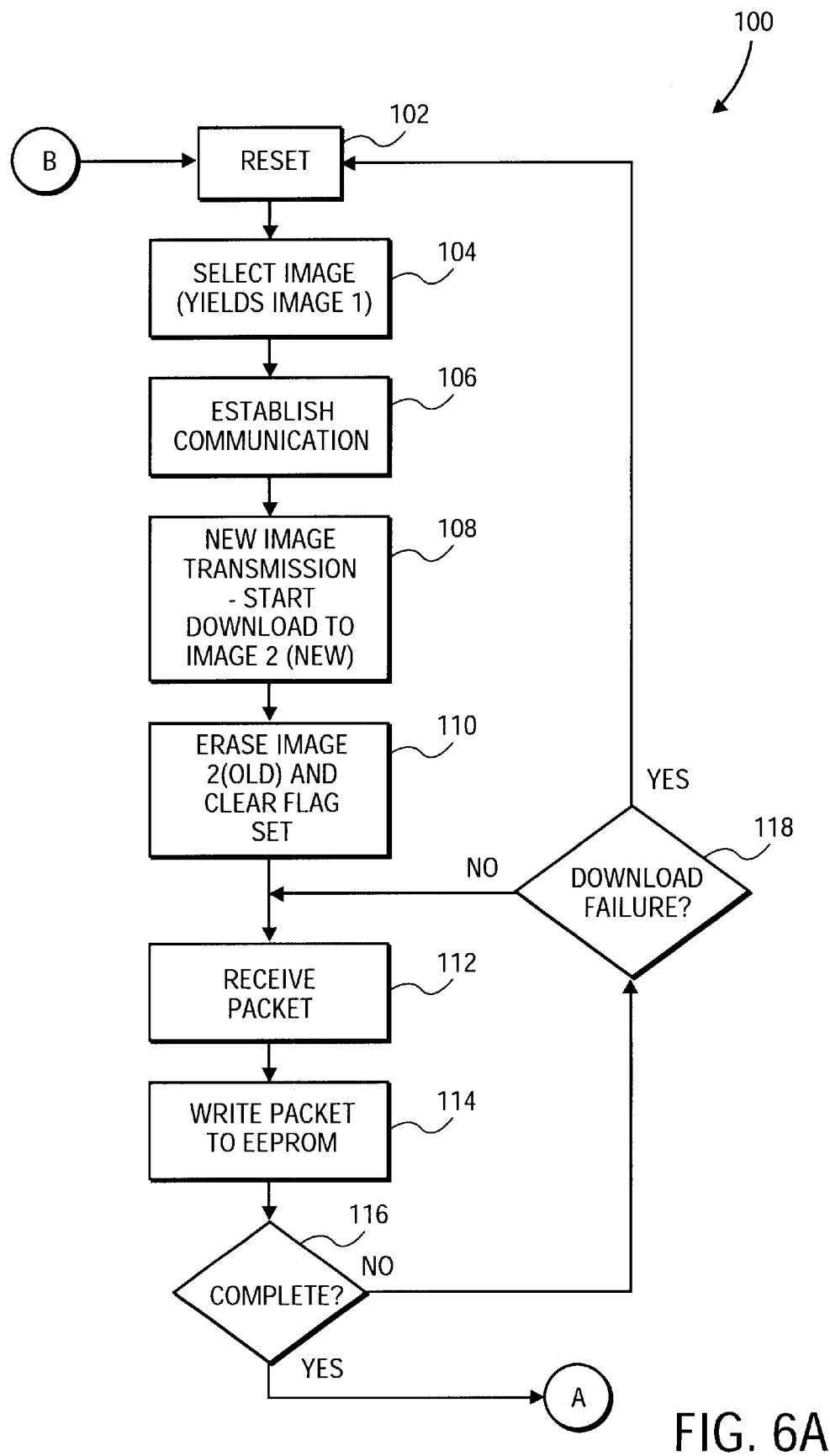
FIGS. 6A and 6B are flowcharts illustrating a method, according to one exemplary embodiment of the present invention, of installing a set of instructions, in the form of an application image, within a machine.
Figure 6B:
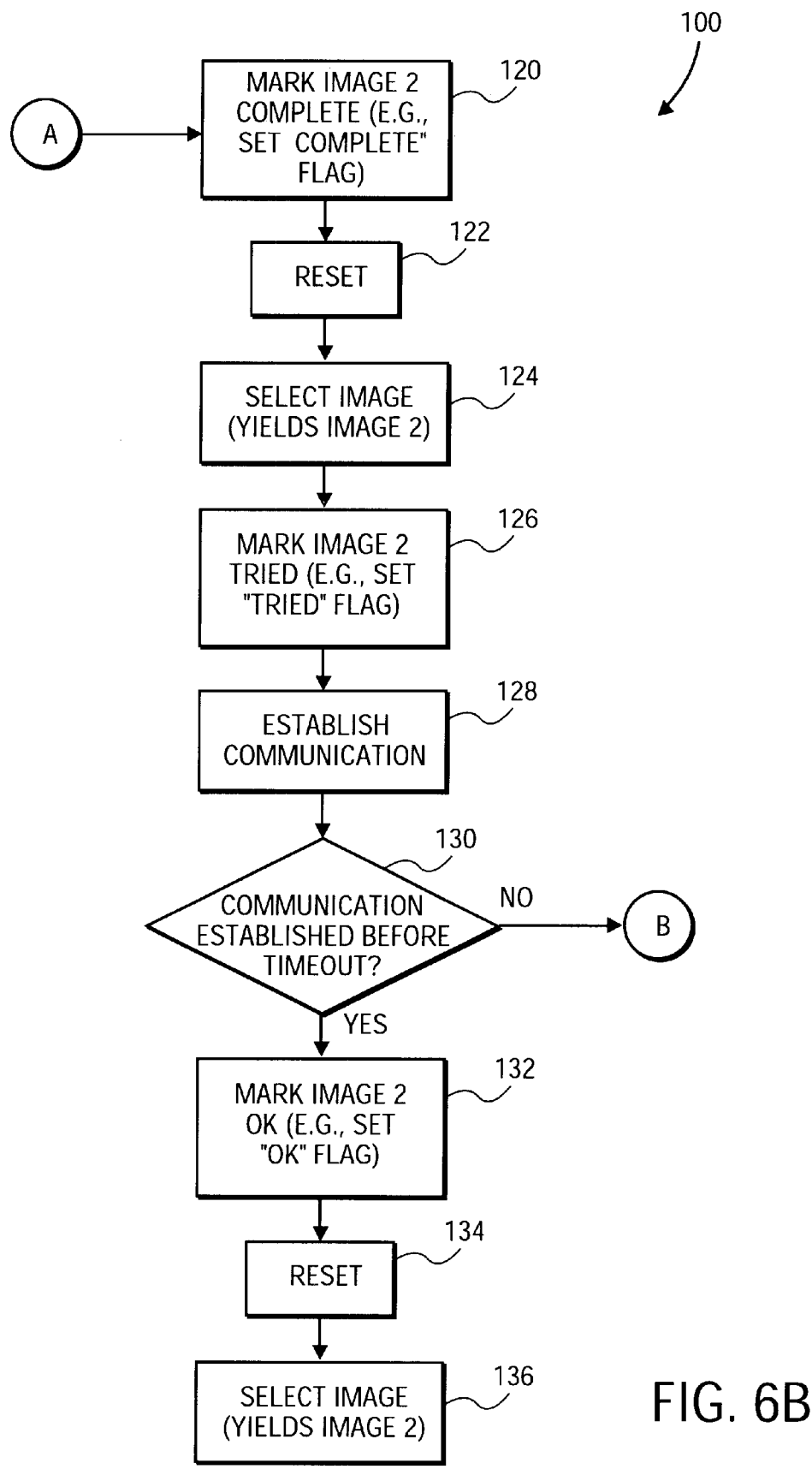

FIGS. 6A and 6B are flowcharts illustrating a method 100, according to one exemplary embodiment of the present invention, of installing a second set of instructions, in the form of an application image, within a machine, such as for example the modem 16. The method 100 commences at step 102 with a reset operation, and proceeds to step 104, where the romStart routine selects a first application image, for example application image 74, as a current image to boot. This determination is made by the romStart routine with input from the NVRAM 50 in the form of the pointer 80 which identifies the application image 74 as the current image.

At step 106, the modem 16 performs a validation operation. While this validation operation may vary from embodiment to embodiment of the present invention, in the present embodiment, the validation operation comprises the step of establishing a communication link between the modem 16 and the ISP 26. Specifically, the establishment of the communication link at step 106 may include booting the modem 16 utilizing the first application image 74 selected at step 104, turning on a Digital Subscriber Line (DSL), synchronizing the modem 16 and ISP hardware, sending a message from the modem 16 to the ISP 26, and receiving a response message from the ISP 26 at the modem 16. It will however be appreciated that, in other applications, any number of other validation operations may be performed to confirm proper operation of the device when executing a set of instructions comprising any particular application image. Having established a communication link at step 106, the transmission of a new, second application image 78 to the modem 16 is commenced at step 108. The File Transfer Protocol (FTP) may be utilized for the transmission of the second application image 78 to the modem 16. For example, the second application image 78 may be propagated to the modem 16 from the software supplier 36 over the PDN 32 and via the ISP 26. In the event that the second application image 78 is to be written to a memory location occupied by a third application image (e.g., an application image that was replaced by the first application image selected at step 104), the third application image is erased, and associated flags 86 are cleared, at step 110. At step 112, a packet included within the transmission begun at step 108 of the new, second application image 78 is received at the modem, and this packet is then written to the EEPROM 44 at step 114. The second application image 78 may be received, merely for example, within the modem 16 via the Ethernet interface 14 from the LAN 14. Alternatively, the second application image 78 may be received into the EEPROM 44 via the UTP interface 46 via the communication link 24 from an external software supplier 36. Referring to FIG. 3, the second application image 78 is written to a separate, distinct memory within the EEPROM 44, so as not to override the first application image 74. At decision box 116, a determination is made as to whether the download of the second application image 78 is complete. This determination is made, for example, by referencing indications provided by the File Transfer Protocol (FTP). If not, the method 100 to proceeds to decision box 118, wherein a determination is made as to whether a download failure has occurred. For example, a packet comprising the transmission to the modem 16 may have been corrupted, or not received. If a download failure has occurred, the method 100 then loops back to step 102, where the reset operation is again performed, and the modem 16 boots using the first image 74. Alternatively, should no download failure 118 be detected at decision box 118, the method 100 loops back to step 112, where a further packet of the transmission of the new application image 78 is received. Assuming no download failure, the method 100 loops through steps 112–118 until the complete second application image 78 has been written into the EEPROM 44.

Figure 7:
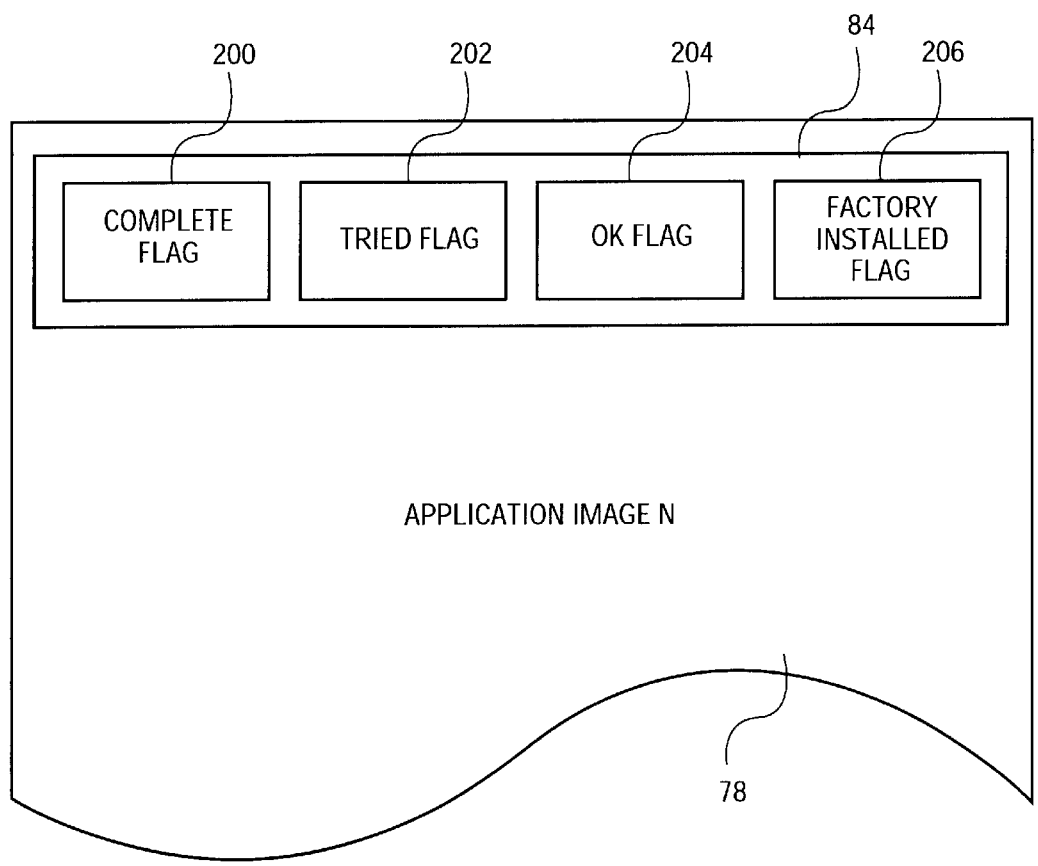
FIG. 7 is a diagrammatic representation of an exemplary application image, illustrating a flag set associated with the application image.

Once it is determined that decision box 116 that the transmission and reception of the second application image 78 has been completed, the method 100 proceeds to step 120, as indicated in FIG. 6B, where the second application image 78 is marked as complete. Referring now to FIG. 7, an exemplary second application image 78 is illustrated. The application image 78 includes a header portion 84 including a number of flags 86, namely:

1. A "complete" flag 200;
2. A "tried" flag 202;
3. An "okay" flag 204; and
4. A "factory installed" flag 206.

The second application image 78 may be marked as complete at step 120 by setting the complete flag 200 to a predetermined state. The setting of the complete flag 200 indicates that the associated second application image 78 is complete and has been completely and successfully written into the EEPROM 44. At step 122, the modem 16 is then again subject to a reset operation. At step 124, the second application image 78 is selected for the boot-up operation. This selection may be performed by temporary indicating the second application image 78 as the current application image within the NVRAM 50. At step 126, the second application image 78 is marked as "tried". For example, the step 126 may include setting the tried flag 202 to a predetermined state. At step 128, the modem 16, under the direction of the set of instructions comprising the second application image 78, attempts to perform a validation operation to validate operation of the modem 16. In one exemplary embodiment, the validation operation may again comprise the establishment of a communication link between the modem 16 and the ISP 26 in the manner described above with reference to step 106. At decision box 130, a determination is made as to whether the communication link has been established before a timeout period. For example, should a "timeout" timer (not shown) within the modem 16 expire, the condition proposed at decision box 130 will not be met, in which case the method 100 returns to step 102, where the modem 16 is reset.

On the other hand, should a communication link the successfully established between the modem 16 and the ISP before the timeout, the second application image 78 is marked as valid at step 132, for example, by setting the OK flag 204 to a predetermined state. Accordingly, the flags 200, 202, and 204 will each have been sent to a predetermined state to indicate the second application image 78 as valid.

The setting of all three flags 200, 202 and 204 to the predetermined state marks the associated application image as a validated boot-up image, and accordingly the pointer 80 within the NVRAM 50 will retain an indication of the application image selected at step 124 as the boot-up image. At step 134 the modem 16 is again subject to a reset operation, whereafter the second application image 78 is selected as the boot-up image at step 136 in accordance with the indication provided by the pointer 80, and on account of the flags 200, 202, and 204 for the second application image 78 indicating the second application image 78 as being successfully validated.

Figure 8:
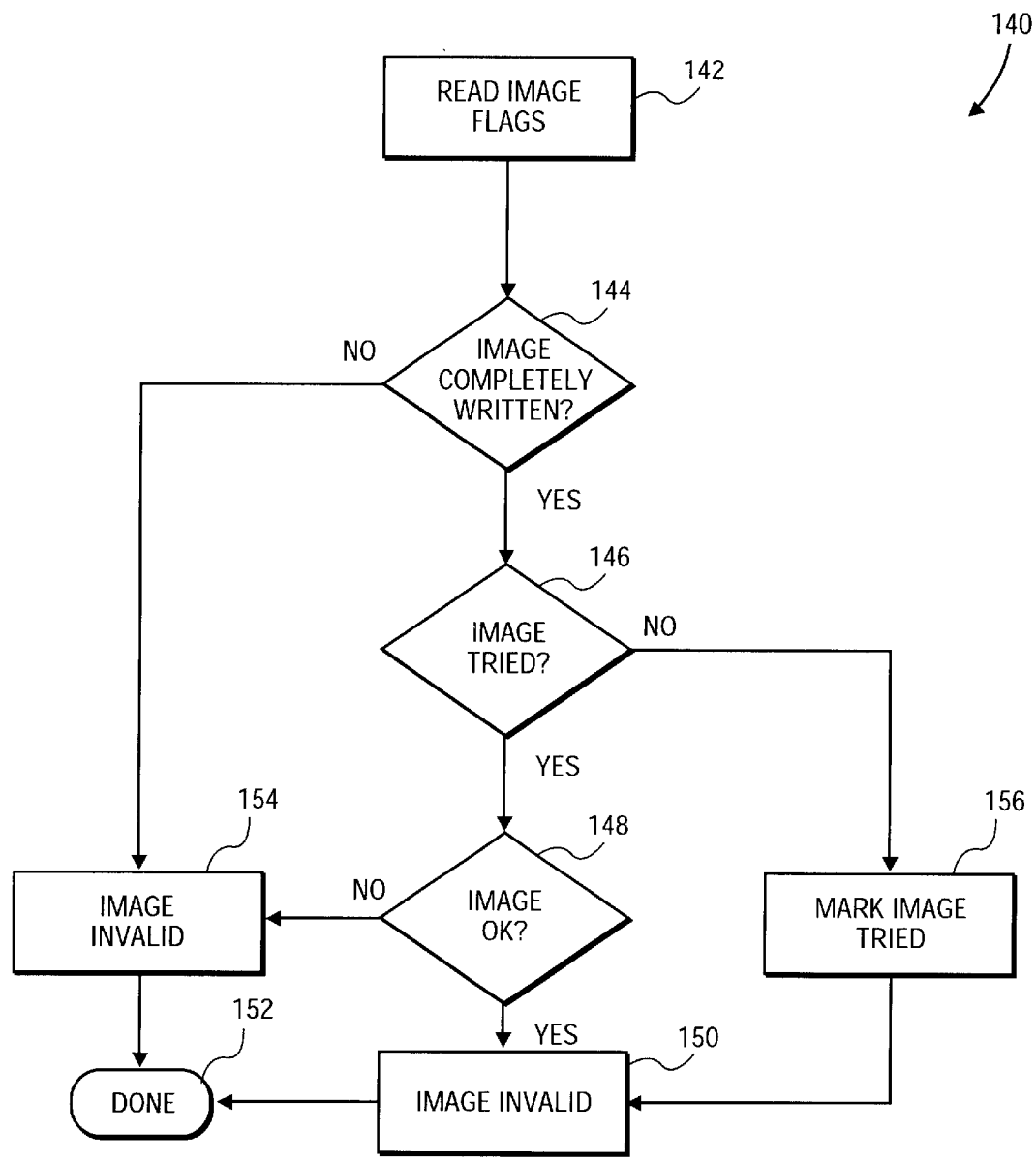
FIG. 8 is a flow chart illustrating a method, according to one exemplary embodiment of the present invention, of determining whether an object code image stored within a memory resource is valid.

Turning now to FIG. 8, there is illustrated a flowchart illustrating a method 140, according to an exemplary embodiment of the present invention, of determining whether an application image is valid by the inspection of various flags 86 included within a header portion 84 associated with the relevant application image. The method 140 may be executed at any one of the steps of method 100 that require the selection of an application image. Specifically, the step of selecting an application image for a boot-up operation may be performed by examining an application image indicated by the pointer 80, and then by determining whether the application image is valid utilizing the method 140.

The method 140 commences at step 142 where the various flags 86 included within the header portion 84 are read. At decision box 144, a determination is made as to whether the complete flag 200 (as illustrated in FIG. 7) indicates that the application image is complete. Specifically, a determination may be made as to whether the complete flag 200 has been set to a logical zero (0). If so, a further determination is then made at decision box 146 whether the image has previously been tried. Specifically, the tried flag 202 is examined to determine whether it has been set, for example, to a logical zero (0). If the image has not been tried (i. e., is newly installed but not yet validated), step 156 marks the image "tried" and proceeds to step 150 indicating that the image is to be executed. If the image has been tried as indicated by flag 202 execution proceeds to decision box 148. Decision box 148 makes a final determination based on the OK flag 204. Specifically the OK flag 204 may be examined to determine whether it has been set, for example, to a logical zero (0). If the OK flag 204 is set, the image has previously successfully performed a predetermined validation operation and hence is valid for execution. The method 140 accordingly recognizes the image as valid at step 150 and terminates at step 152. If the OK flag 204 is not set the method 140 determines that the validation has been attempted but failed, recognizes the image as invalid at step 154, and terminates at step 152.

The method 140 proposed by the present invention is advantageous in that it does not permit a target device to view an application image as being valid, and therefore selectable as a current and executable application image, unless the application image is confirmed as being completely written to a memory resource within the target device and also successfully performs a validation function. During the writing and validation steps of a "new" or second set of instructions in the form of a second application image, an "old" or first set of instructions in the form of a first application image is not overwritten, and maintained executable, so as to ensure that the target device is not rendered unbootable as a result of the loading of the second set of instructions. The invention is advantageous in that the frequency of service calls by personnel to target devices, which may comprise embedded devices in inaccessible locations, may be reduced.

Returning to FIG. 2, the processor 42, EEPROM 44, and RAM 48 are each shown to include a sequence of machine-readable instructions 160, or at least a portion of such a sequence of instructions, that when executed by the machine, such as for example the modem 16, cause the machine to perform any one of the steps described above in the specification, and specifically the steps described with reference to the flow charts shown above. Accordingly, for the purposes of the specification, the term "machine-readable medium" shall be taken to include any medium that is capable of storing or otherwise accommodating a sequence of instructions for execution by a machine, and that cause the machine to perform the methodologies of the present invention. Accordingly, the term "machine-readable medium" shall be taken to include, but not be limited to, solid-state memories, optical and magnetic disks, and carrier-wave signals. For example, the instructions for performing the methodologies of the present invention may be propagated to a target machine via a communication link and be encoded within a suitable carrier-wave signal.

Thus, a method and apparatus for installing a second set of instructions within a machine, the machine including a memory resource storing first and second set of instructions, have been described. Although the present invention has been described with reference to specific exemplary embodiments, it will be evident that various modifications and changes may be made to these embodiments without departing from the broader scope and spirit of the invention. Accordingly, the specification and drawings are to be regarded in an illustrative rather than a restrictive sense.

What is claimed is:

1. A method of installing a second set of instructions within a machine, the machine including a memory resource storing a first set of instructions, the method including:

executing the first set of instructions;

loading a second set of instructions into the memory resource from a remote device, while maintaining the first set of instructions within the memory resource;

validating the second set of instructions, the validating including determining whether the machine, operating under the direction of the second set of instructions, successfully performs a predetermined function; and if the second set of instructions is valid, indicating the second set of instructions as executable in place of the first set of instructions, wherein the predetermined function includes establishing communications between the machine and the remote device under direction of the second set of instructions.

2. The method of claim 1 wherein the validating includes determining whether the second set of instructions is completely stored within the memory resource.

3. The method of claim 2 wherein the validating includes, subsequent to the determination of whether the second set of instructions is completely stored within the memory resource, resetting the machine for execution of the second set of instructions.

4. The method of claim 1 wherein the validating includes determining whether execution of the second set of instructions has been previously attempted.

5. The method of claim 1 wherein the machine is a modem, and wherein the validating includes determining whether the modem establishes a communication link with the remote device.

6. The method of claim 5 wherein establishing of the communication link includes timing out a communication operation after a predetermined time threshold.

7. The method of claim 1 including, subsequent to the performance of the predetermined function, resetting in the machine for execution of the second set of instructions.

8. The method of claim 1 including loading the second set of instructions into the memory resource subsequent to commencement of the execution of the first set of instructions, while maintaining the first set of instructions within the memory resource.

9. The method of claim 8 wherein the loading includes loading an object code image into a read-only memory.

10. The method of claim 9 wherein the loading of the object code image includes loading a compressed object code image.

11. The method of claim 8 wherein the loading includes downloading the second set of instructions to the memory resource from a remote location.

12. The method of claim 11 wherein the executing of the second set of instructions includes decompressing an object code image and transferring the object code image from a read-only memory to a random access memory.

13. The method of claim 1 wherein the indicating includes setting a pointer to indicate the second set of instructions for default execution.

14. The method of claim 1 including resetting the machine, and executing the second set of instructions.

15. A machine comprising:
a memory resource to store a first and second set of instructions; and
logic to execute the first set of instructions, to load the second set of instructions into the memory resource from a remote device while maintaining the first set of instructions within the memory resource, to validate the second set of instructions by determining whether the machine, when executing the second set of instructions, successfully performs a predetermined function, and to indicate the second set of instructions as executable in place of the first set of instructions,
wherein the predetermined function includes establishing communications between the machine and the remote device under direction of the second set of instructions.

16. The machine of claim 15 wherein the logic determines whether the second set of instructions was completely written to the memory resource of the machine.

17. The machine of claim 15 wherein the logic determines whether execution of the second set of instructions has previously been attempted.

18. The machine of claim 15 wherein the logic determines whether a communication link is established between the machine and a remote device.

19. The machine of claim 18 wherein the logic determines whether the communication link is established within a predetermined time-out period.

20. The machine of claim 15 including an interface via which the second set of instructions is loaded into the memory resource subsequent to the commencement of execution of the first set of instructions, while maintaining the first set of instructions within the memory resource.

21. The machine of claim 20 wherein the interface facilitates the loading of the second set of instructions into the memory resource from the remote location.

22. The machine of claim 15 wherein the memory resource comprises a read-only memory, and the second set of instructions comprises an object code image.

23. The machine of claim 15 including a pointer to indicate either the first or the second set of instructions as a default set of instructions for execution by the machine.

24. The machine of claim 23 wherein the logic sets the pointer to indicate the second set of instructions for default execution after validating the second set of instructions.

25. The machine of claim 24 wherein the pointer comprises a memory resource storing a flag.

26. A machine-readable medium storing a sequence of instructions that, when executed by a machine, cause the machine to:
load a replacement set of instructions from a remote device, while executing an existing set of instructions;
validate the replacement set of instructions by determining whether the replacement set of instructions executes to establish communications with the remote device; and
if the second set of instructions is valid, then indicate the second set of instructions as executable by the machine in place of the first set of instructions.

27. A method to install replacement software, the method including:
downloading the replacement software from a provider to a target device, the replacement software to replace existing software stored by the target device; and
causing execution of the replacement software by the target device so as to validate the replacement software,
wherein the replacement software is validated upon detection of a successful establishment of communications between the target device, operating under direction of the replacement software, and the provider.

28. The method of claim 27 including downloading the replacement software to the target device subsequent to commencement of execution of the existing software, while maintaining the existing software at the target device.

29. The method of claim 27 wherein the downloading of the replacement software includes downloading an object code image into read-only memory of the target device.

30. The method of claim 29 wherein the downloading of the object code image includes downloading a compressed code image.

31. The method of claim 29 wherein the causing of the execution of the replacement software includes decompressing the object code image, and transferring the object code image from the read-only memory to a random access memory.

32. A machine-readable medium storing a sequence of instructions that, when executed by a source machine, cause the source machine to perform the operations of:
downloading replacement software from a provider to a target device, the replacement software to replace existing software stored by the target device; and
causing execution of the replacement software by the target device so as to validate the replacement software,
wherein the replacement software is validated upon detection of a successful establishment of communications between the target device, operating under the direction of the replacement software, and the provider.

* * * * *